US006525125B1

(12) United States Patent
Giardello et al.

(10) Patent No.: US 6,525,125 B1
(45) Date of Patent: Feb. 25, 2003

(54) POLYOLEFIN COMPOSITIONS HAVING VARIABLE DENSITY AND METHODS FOR THEIR PRODUCTION AND USE

(75) Inventors: Michael A. Giardello, Pasadena, CA (US); Jonathon G. Lasch, Pasadena, CA (US); Christopher J. Cruce, Poway, CA (US); Jessie G. Macleod, Pasadena, CA (US); Christopher M. Haar, Pasadena, CA (US)

(73) Assignee: Materia, Inc., Pasadena, CA (US)

( * ) Notice: Subject to any disclaimer, the term of this patent is extended or adjusted under 35 U.S.C. 154(b) by 0 days.

(21) Appl. No.: 09/497,950

(22) Filed: Feb. 4, 2000

Related U.S. Application Data

(60) Provisional application No. 60/118,865, filed on Feb. 5, 1999.

(51) Int. Cl.[7] .................................................. C08K 3/08
(52) U.S. Cl. ........................ 524/439; 524/440; 524/441; 524/494; 523/218; 523/219
(58) Field of Search ................................ 524/439, 440, 524/441, 494; 523/218, 219

(56) References Cited

U.S. PATENT DOCUMENTS

| | | | |
|---|---|---|---|
| 4,049,616 A | * 9/1977 | Scott | 260/42.32 |
| 4,317,888 A | * 3/1982 | Watanabe | 521/79 |
| 4,413,067 A | * 11/1983 | Tsuchiya | 523/172 |
| 4,594,213 A | * 6/1986 | Ealer | 264/211 |
| 4,899,005 A | * 2/1990 | Lane | 585/360 |
| 5,055,499 A | * 10/1991 | Endo | 523/214 |
| 5,077,414 A | 12/1991 | Arduengo, III | 548/335 |
| 5,096,644 A | * 3/1992 | Endo | 264/244 |
| 5,098,750 A | * 3/1992 | Ueno | 428/304.4 |
| 5,182,405 A | 1/1993 | Arduengo, III | 548/335.1 |
| 5,312,940 A | 5/1994 | Grubbs et al. | 556/136 |
| 5,342,909 A | 8/1994 | Grubbs et al. | 526/171 |
| 5,710,298 A | 1/1998 | Grubbs et al. | 556/22 |
| 5,728,839 A | 3/1998 | Herrmann et al. | 548/103 |
| 5,728,917 A | 3/1998 | Grubbs et al. | 585/653 |
| 5,831,108 A | 11/1998 | Grubbs et al. | 556/21 |
| 5,840,238 A | 11/1998 | Setiabudi et al. | 264/331.17 |
| 5,849,851 A | 12/1998 | Grubbs et al. | 526/93 |
| 5,922,802 A | * 7/1999 | Setiabudi | 524/482 |
| 5,936,100 A | 8/1999 | Fürstner et al. | 549/266 |
| 5,939,504 A | 8/1999 | Woodson et al. | 526/145 |
| 6,001,909 A | 12/1999 | Setiabudi | 524/265 |
| 6,020,443 A | 2/2000 | Woodson et al. | 526/135 |
| 6,025,496 A | 2/2000 | Herrmann et al. | 548/107 |
| 6,100,323 A | * 8/2000 | Setiabudi | 524/430 |
| 6,107,420 A | * 8/2000 | Grubbs | 526/73 |
| 6,124,029 A | * 9/2000 | Schreck | 428/327 |
| 6,147,136 A | * 11/2000 | Bissinger | 523/116 |
| 6,169,138 B1 | * 1/2001 | Petit | 524/500 |

FOREIGN PATENT DOCUMENTS

| | | | |
|---|---|---|---|
| WO | WO 97/20865 | 6/1997 | C08F/4/80 |
| WO | WO 97/29135 | 8/1997 | |
| WO | WO 99/51344 | 10/1999 | |
| WO | WO 00/15339 | 3/2000 | |
| WO | WO 00/58322 | 10/2000 | |

OTHER PUBLICATIONS

Herrmann et al. "Nickel(II) Complexes of N–Heterocyclic Carbenes," Organometallics, 16, 2209–2212 (1997).

Herrmann et al. "N–Heterocyclic Carbenes," Angew Chem. Int. Ed. Engl., 36, 2162–2187 (1997).

Glander, et al. "Development and Application of Highly Efficient Ruthenium–Based Catalysts for the Ring Opening Metathesis Polymerization," Macromol. Symp. 127, 67–75 (1998).

Nolan, Steven P. "Synthetic, Thermochemical and Catalytic Studies of Ruthenium and Rhodium Complexes," Jun. 26, 1998.

Herrmann et al. "A Novel Class of Ruthenium Catalysts for Olefin Metathesis" Abstract: 11th International Symposium in homogenous Catalysis, University of St. Andrews, Scotland U.K. Jul. 1998.

Herrmann, et al. "A Novel Class of Ruthenium Catalysts for Olefin Metathesis," Angewandte Chemie International Edition, 37, 18, 2490–2493 (Oct. 2, 1998).

(List continued on next page.)

Primary Examiner—Edward J. Cain
(74) Attorney, Agent, or Firm—David Jaffer; Pillsbury Winthrop LLP

(57) ABSTRACT

The invention discloses a composition comprising one or more density modulators dispersed in a polymer matrix wherein the matrix is prepared by the metathesis of an olefin monomer using a ruthenium or osmium metal carbene catalyst. The composition may use a catalyst of the formula

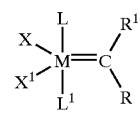

wherein:

M is ruthenium or osmium; X and $X^1$ are either the same or different and are any anionic ligand; L and $L^1$ are either the same or different and are any neutral electron donor; R and $R^1$ are either the same or different and are each independently hydrogen or a substitutent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted. The density modulators are selected from the group consisting of metallic density modulators, microparticulate density modulators and macroparticulate density modulators.

54 Claims, No Drawings

OTHER PUBLICATIONS

Ackerman, et al. "Ruthenium Carbene Complexes with Imidazolin–2–ylidene Ligands Allow the Formation of Tetrasubstituted Cycloalkenes by RCM," Tetrahedron Letters, 40, 4787–4790 (1999).

Huang, et al. "Influence of Sterically Demanding Carbene Ligation on Catalytic Behavior and Thermal Stability of Ruthenium Olefin Metathesis Catalysts," Organometallics, 18, 5375–5380 (1999).

Furstner, et al., "Cationic ruthenium allenylidene complexes as a new class of performing catalysts for ring closing metathesis," Chem. Commun., 1998, pp. 1315–1316.

* cited by examiner

POLYOLEFIN COMPOSITIONS HAVING VARIABLE DENSITY AND METHODS FOR THEIR PRODUCTION AND USE

This application claims the benefit of co-pending U.S. Provisional Patent Application Serial No. 60/118,865, filed Feb. 5, 1999, the contents of which are incorporated herein by reference.

FIELD OF THE INVENTION

The invention is directed generally to polyolefin compositions having variable density properties and to methods of producing and using the same. More specifically, the invention relates to the use of density modulators and, in a preferred form to polymer-based compositions based on dicyclopentadiene (DCPD) and other cyclic olefins comprising such density modulators.

BACKGROUND OF THE INVENTION

During the past 25 years, research efforts have enabled the elucidation of olefin metathesis reactions catalyzed by transition metal complexes. In particular, certain ruthenium and osmium carbene compounds have been identified as effective catalysts for olefin metathesis reactions such as, for example, ring opening metathesis polymerization (ROMP). Examples of such metathesis catalysts have been previously described in, for example, U.S. Pat. Nos. 5,312,940, 5,342,909, 5,728,917, 5,710,298, 5,831,108, and 6,001,909; PCT Publications WO 97/20865, WO 97/29135 and WO 99/51344; in United States Provisional Patent Application No. 60/142,713 filed Jul. 7, 1999 entitled "ROMP Reactions Using Imidazolidine-Based Metal Carbene Metathesis Catalysts;" and by Furstner, Picquet, Bruneau, and Dixneuf in Chemical Communications, 1998, pages 1315–1316, the disclosures of each of which are incorporated herein by reference.

Density-modulated polymer compositions can be advantageous in a variety of applications, especially where "weight" or "balance" of a polymeric part or article is a critical consideration. For example, density-modulated polymers would be useful materials for the production of equipment for the sports, recreation, and marine industries, particularly where dense, heavy articles or, alternatively, low-density, light foam articles are desired. Traditionally, numerous density-modulating additives have been used to effect these changes. However, where these traditional density modulators have been used in conjunction with typical thermoset or thermoplastic resins, numerous limitations or problems have arisen. Traditional thermoset resin systems lack inherent toughness and, once filled with conventional density modulators, become even more brittle in nature. Moreover, the high viscosity of these traditional resins prevents either the high loading of density modulators or the production of void-free articles. Thus, it has not been possible to combine the performance advantages provided by certain physical properties of polymers with the ability to vary the density of the polymer composition over a wide range without dramatically decreasing the practical value by increasing brittleness or void content of the articles produced.

In light of the foregoing, there exists a need for polymer compositions, and articles of made therefrom, which may be formulated to have variable densities for use in a wide range of commercial applications, especially those related to the sports, recreation, and marine industries.

SUMMARY OF THE INVENTION

This invention relates to novel polyolefin compositions having variable density, as well as to methods for producing and using the same. In particular, the invention provides for the inclusion of density modulators, which may be added to polyolefin resins. We have now found that these density modulators permit controllable modulation when used with a selected range of polymeric materials, of the density or "weight" of a resulting polyolefin article. Such modified polyolefin compositions are useful in a variety of applications and products, particularly those in the sports, recreational, and marine fields.

In certain preferred embodiments, the polyolefin compositions of the invention are prepared by the ring-opening metathesis polymerization (ROMP) of dicyclopentadiene (DCPD) and related cyclic olefins, polymerized with a metal catalyst system. Ruthenium and osmium carbene compounds have been identified as effective catalysts for olefin metathesis reactions such as, for example, ROMP. Such metal carbene metathesis catalysts have been previously described in, for example, U.S. Pat. Nos. 5,312,940, 5,342,909, 5,728,917, 5,710,298, 5,831,108, and 6,001,909; PCT Publications WO 97/20865, WO 97/29135 and WO 99/51344; in United States Provisional Patent Application No. 60/142,713 filed Jul. 7, 1999 entitled "ROMP Reactions Using Imidazolidine-Based Metal Carbene Metathesis Catalysts;" and by Fuirstner, Picquet, Bruneau, and Dixneuf in Chemical Communications, 1998, pages 1315–1316, the disclosures of each of which are incorporated herein by reference.

Examples of olefin monomers that may be polymerized using the aforementioned metathesis catalysts include dicyclopentadiene (DCPD), in addition to other cyclic olefin compounds. Polymer compositions, and articles or parts produced therefrom, are useful in a wide variety of applications because of their unique physical properties and ease of fabrication. In particular, DCPD-based polymer (polyDCPD) compositions show promise for applications requiring a combination of toughness, hardness, variable density, and/or corrosion resistance. In addition, the low viscosity of DCPD-based compositions makes these resins particularly well-suited to the fabrication of complex shapes and composites.

In preferred embodiments, the invention involves ROMP reactions where olefin (such as DCPD resin) compositions are cast into product molds or infused into a fiber preform. For certain applications, pigments, dyes, antioxidants, flame retardants, toughness modulators, hardness modulators, among other additives, may optionally be included in the polyolefin composition. In its preferred forms, the invention includes two main groups of modified polyolefin compositions: (1) polyolefin compositions that are lighter in density or weight than the unmodified polyolefin resins and (2) polyolefin compositions that are higher in density or weight than the unmodified polyolefin resins. The modulating additives are dispersed in the polyolefin resin matrix to alter various physical properties of the native polyolefin.

Particularly preferred density modulators include, for example, metallic density modulators (in the case of increased-density polyolefin compositions), microparticulate density modulators, such as, for example, microspheres (in the case of increased- or decreased-density polyolefin compositions), and macroparticulate density modulators, such as, for example, glass or ceramic beads (in the case of increased- or decreased-density polyolefin compositions). Metallic density modulators include, but are not limited to, powdered, sintered, shaved, flaked, filed, particulated, or granulated metals, metal oxides, metal nitrides, and/or metal carbides, and the like. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like. Density modulators of the invention may optionally comprise sizings, finishes, coatings, and/or surface treatments to enhance their compatibility with and/or adhesion to the polyolefin matrix resins.

One aspect of the invention is a novel polyolefin composition having variable density properties through the addition of density modulators. Another aspect of the invention is a process for preparing such variable-density polyolefin compositions, wherein the process includes the step of adding to a polyolefin resin various density modulators. A further aspect is an article of manufacture, such as a molded part, comprising the aforementioned polyolefin composition. These and other aspect of the invention will be apparent to one skilled in the art in light of the following detailed description of the preferred embodiments.

DETAILED DESCRIPTION OF THE PREFERRED EMBODIMENTS

The invention is directed to polyolefin compositions having variable density properties and to methods for their production and use. In certain embodiments, the invention provides for density modulators, which may be added to polyolefin resins to alter various physical properties. More specifically, addition of density modulators allows controllable modulation of the density or "weight" of a polyolefin article. Such modified polyolefin compositions are useful in a wide variety of applications, particularly for use in sports, recreation, and marine equipment products.

The polyolefin compositions of the invention may be prepared by the metathesis of olefin monomers such as DCPD and related cyclic olefins, polymerized with a metal catalyst system. Ruthenium and osmium carbene compounds have been identified as effective catalysts for olefin metathesis reactions such as, for example, ring opening metathesis polymerization (ROMP) and are described in the patents and other references noted above, as is known in the art.

Any suitable metathesis catalyst may be used. One example of a ruthenium or osmium metal carbene catalyst that may be used with the invention possesses metal centers that are formally in the +2 oxidation state, have an electron count of 16, are penta-coordinated, and are of the general formula

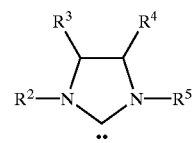

wherein:
M is ruthenium or osmium;
X and $X^1$ are each independently any anionic ligand;
L and $L^1$ are each independently any neutral electron donor ligand;
R and $R^1$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, each of the R or $R^1$ substituent group may be substituted with one or more moieties selected from the group consisting of $C_1$–$C_{10}$ alkyl, $C_1$–$C_{10}$ alkoxy, and aryl which in turn may each be further substituted with one or more groups selected from a halogen, a $C_1$–$C_5$ alkyl, $C_1$–$C_5$ alkoxy, and phenyl. Moreover, any of the catalyst ligands may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In preferred embodiments of these catalysts, the R substituent is hydrogen and the $R^1$ substituent is selected from the group consisting $C_1$–$C_{20}$ alkyl, $C_2$–$C_{20}$ alkenyl, and aryl. In even more preferred embodiments, the $R^1$ substituent is phenyl or vinyl, optionally substituted with one or more moieties selected from the group consisting of $C^1$–$C_5$ alkyl, $C_1$–$C_5$ alkoxy, phenyl, and a functional group. In especially preferred embodiments, $R^1$ is phenyl or vinyl substituted with one or more moieties selected from the group consisting of chloride, bromide, iodide, fluoride, —$NO_2$, —$NMe_2$, methyl, methoxy and phenyl. In the most preferred embodiments, the $R^1$ substitutent is phenyl.

In preferred embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether. In more preferred embodiments, L and $L^1$ are each a phosphine of the formula $PR^3R^4R^5$, where $R^3$, $R^4$, and $R^5$ are each independently aryl or $C_1$–$C_{10}$ alkyl, particularly primary alkyl, secondary alkyl or cycloalkyl. In the most preferred embodiments, L and $L^1$ ligands are each selected from the group consisting of —P(cyclohexyl)$_3$, —P(cyclopentyl)$_3$, —P(isopropyl)$_3$, and —P(phenyl)$_3$. Another preferred embodiment of the catalyst is where L is any neutral electron donor and $L^1$ is an imidazolidine ligand. In certain embodiments, $L^1$ may have the general formula

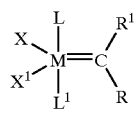

wherein:
$R^2$, $R^3$, $R^4$, and $R^5$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. $R^3$ and $R^4$ may also together form a cycloalkyl or an aryl moiety. A preferred embodiment is where $R^3$ and $R^4$ are both hydrogen or phenyl and $R^2$ and $R^5$ are each independently substituted or unsubstituted aryl. In addition, L and $L^1$ together may comprise a bidentate ligand.

In preferred embodiments of these catalysts, X and $X^1$ are each independently hydrogen, halide, or one of the following groups: $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, or $C_1$–$C_{20}$ alkylsulfinyl.

Optionally, X and $X^1$ may be substituted with one or more moieties selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. In more preferred embodiments, X and $X^1$ are halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride. In addition, X and $X^1$ together may comprise a bidentate ligand.

The catalyst:olefin monomer ratio in the invention is preferably is in a range of about 1:100 to about 1:1,000,000. More preferably, the catalyst:monomer ratio is in a range of about 1:1,000 to about 1:150,000 and, most preferably, is in a range of about 1:3,000 to about 1:60,000. Particularly preferred metal catalysts include, but are not limited to, bis(tricyclohexylphosphine) benzylidene ruthenium dichloride, bis(tricyclohexylphosphine) dimethylvinylmethylidene ruthenium dichloride, bis(tricyclopentylphosphine) dimethylvinylmethylidene ruthenium dichloride, (tricyclohexylphosphine)(1,3-dimesityl-4,5-dihydroimidazol-2-ylidene) benzylidene ruthenium dichloride, (tricyclopentylphosphine)(1,3-dimesityl-4,5-dihydroimidazol-2-ylidene) dimethylvinylmethylidene ruthenium dichloride, (tricyclohexylphosphine)(1,3-dimesityl-4,5-dihydroimidazol-2-ylidene) dimethylvinylmethylidene ruthenium dichloride, (tricyclohexylphosphine) (1,3-dimesitylimidazol-2-ylidene) benzylidene ruthenium dichloride, (tricyclopentylphosphine)(1,3-dimesitylimidazol-2-ylidene) dimethylvinylmethylidene ruthenium dichloride, and (tricyclohexylphosphine)(1,3-dimesitylimidazol-2-ylidene) dimethylvinylmethylidene ruthenium dichloride.

The invention includes two principal types of modified polyolefin compositions: (1) polyolefin compositions that are lighter in density or weight than the unmodified polyolefin resins and (2) polyolefin compositions that are higher in density or weight than the unmodified polyolefin resins. The modulating additives are dispersed in the polyolefin resin matrix to alter various physical properties of the native polyolefin. In the case of polyolefin compositions containing density modulators, the density or "weight" of an article may be controllably varied to suit a particular application by altering the identity and amount of the density modulator. In the case of polyolefin compositions containing hardness and/or toughness modulators, various physical properties of an article, including hardness, toughness, elasticity, and surface "feel," may be varied to suit a given application. Hardness and/or toughness modified polyolefin compositions are described in U.S. patent application Ser. No. 09/312,811 filed May 17, 1999 entitled "Polyolefin Compositions Optionally Having Variable Toughness and/or Hardness;" all of which is incorporated herein by reference. For certain applications and products (e.g., weighted golf club heads), polyolefin hybrids containing density, hardness, and toughness modulators may be preferred. Hybrid modified poly-DCPD articles can combine, for example, increased density with increased toughness.

Density modulators include, for example, metallic density modulators (in the case of increased-density polyolefin compositions), microparticulate density modulators, such as, for example, microspheres (in the case of increased- or decreased-density polyolefin compositions), and macroparticulate density modulators, such as, for example, glass or ceramic beads (in the case of increased- or decreased-density polyolefin compositions). Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like. Density modulators of the invention may optionally comprise sizings, finishes, coatings, and/or surface treatments to enhance their compatibility with and/or adhesion to the polyolefin matrix resins. Particularly preferred are the use of adhesion agents to increase adhesion between the density modulators and polyolefin resins. Such adhesion agents are described in, for example, U.S. Provisional Patent Application Serial No. 60/118,864, filed Feb. 5, 1999, and U.S. patent application Ser. No. 09/497,774, filed Feb. 4, 2000, entitled "Metathesis-Active Adhesion Agents and Methods for Enhancing Polymer Adhesion to Surfaces," the contents of each of which are incorporated herein by reference.

The density modulator(s) may be dispersed in the polyolefin resin matrix by stirring or mixing with the olefin monomer(s) and then polymerizing the mixture using a metathesis or metal carbene catalyst. Alternatively, the olefin monomer(s) may be infused into a bed or preform of the density modulator(s) and then polymerized using a metathesis or metal carbene catalyst. The density, wear resistance and/or "feel" of a density-modulated poly-DCPD composite may be varied in a controllable manner. For example, poly-DCPD compositions containing aluminum metal powder have a soft surface "feel", while poly-DCPD compositions containing aluminum oxide have a rough surface and are extremely wear-resistant. Similarly, poly-DCPD compositions containing thermoplastic microspheres are very tough with a soft "feel," while poly-DCPD compositions containing glass microspheres are harder and stiffer. In the case of density-modulated poly-DCPD composite resins, articles or parts made therefrom may be produced to be isotropic, where the density modulator is dispersed evenly throughout the article or part, or anisotropic, where the density modulator is dispersed unevenly (either through the use of layers or a density gradient). For certain articles, it will be preferred that the density-modulated composition possess a thin layer (or skin) of neat resin at the surface to enhance appearance, toughness, corrosion resistance, or other properties.

The amount of metallic density modulator(s) included in the polyolefin compositions of the invention is about 1% to about 99% by volume. Preferably, the amount of density modulator(s) is about 20% to about 90% by volume and most preferably, is about 30% to about 80% by volume. In cases where extreme density modulation is of utmost importance, the amount of density modulator(s) is preferably about 60% to about 95% by volume. Using the volume percentage, one skilled in the art can determine the appropriate weigh fraction to use based on the known densities of the resin and the density modulator used. For example, the amount of metallic density modulator included in the polyolefin compositions of the invention is preferably about 1 to about 17000 parts per hundred resin(phr) by weight. More preferably, the amount of metallic density modulator is about 50 to about 7500 phr and, most preferably, is about 100 to about 1000 phr. The amount of microparticulate density modulator included in the polyolefin compositions of the invention is preferably about 1 to about 1000 phr by weight. More preferably, the amount of microparticulate density modulator is about 10 to about 500 phr and, most preferably, is about 20 to about 250 phr. The amount of macroparticulate density modulator included in the polyolefin compositions of the invention is preferably about 1 to about 5000 phr by weight. More preferably, the amount of macroparticulate density modulator is about 10 to about 1000 phr and, most preferably, is about 20 to about 500 phr.

In the case of microparticulate density modulators, the poly-olefin resin compositions of the invention have numerous advantages over traditional thermoset polymers (e.g., epoxies, vinyl esters, unsaturated polyesters, urethanes, and silicones) in the fabrication of low- to medium-density syntactic foams. Syntactic foams are known to those skilled in the art but generally describe a cellular polymer produced by dispersing microscopic particles in a fluid polymer and then stabilizing the system. Specifically, these poly-olefin resins combine low viscosity (e.g., <20 centipoise), long gelling times (e.g., >20 minutes), high inherent toughness, and high tensile strength. The low density and viscosity of the poly-olefin resins of the invention permit better wetout and packing of the microspheres, resulting in improved physical properties and, simultaneously, decreased densities (preferably, about 5%–30% decrease), compared to current state-of-the-art conventional resin systems.

The most preferred olefin monomer for use in the invention is dicyclopentadiene (DCPD). Various DCPD suppliers and purities may be used such as Lyondell 108 (94.6% purity), Veliscol UHP (99+% purity), B. F. Goodrich Ultrenee (97% and 99% purities), and Hitachi (99+% purity). Other preferred olefin monomers include other cyclopentadiene oligomers including trimers, tetramers, pentamers, and the like; cyclooctadiene (COD; DuPont); cyclooctene (COE, Alfa Aesar); cyclohexenylnorbornene (Shell); norbornene (Aldrich); norbornene dicarboxylic anhydride (nadic anhydride); norbornadiene (Elf Atochem); and substituted norbornenes including butyl norbornene, hexyl norbornene, octyl norbornene, decyl norbornene, and the like. Preferably, the olefinic moieties include mono- or disubstituted olefins and cycloolefins containing between 3 and 200 carbons. Most preferably, metathesis-active olefinic moieties include cyclic or multicyclic olefins, for example, cyclopropenes, cyclobutenes, cycloheptenes, cyclooctenes, [2.2.1]bicycloheptenes, [2.2.2]bicyclooctenes, benzocyclobutenes, cyclopentenes, cyclopentadiene oligomers including trimers, tetramers, pentamers, and the like; cyclohexenes. It is also understood that such compositions include frameworks in which one or more of the carbon atoms carry substituents derived from radical fragments including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the olefin may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carboiimide, carboalkoxy, carbamate, halogen, or pseudohalogen. Similarly, the olefin may be substituted with one or more groups such as $C_1$–$C_{20}$ alkyl, aryl, acyl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, arylthio, $C_1$–$C_{20}$ alkylsulfonyl, and $C_1$–$C_{20}$ alkylsulfinyl, $C_1$–$C_{20}$ alkylphosphate, arylphosphate, wherein the moiety may be substituted or unsubstituted.

These olefin monomers may be used alone or mixed with each other in various combinations to adjust the properties of the olefin monomer composition. For example, mixtures of cyclopentadiene dimer and trimers offer a reduced melting point and yield cured olefin copolymers with increased mechanical strength and stiffniess relative to pure poly-DCPD. As another example, incorporation of COD, norbornene, or alkyl norbornene comonomers tend to yield cured olefin copolymers that are relatively soft and rubbery. The polyolefin resins of the invention are amenable to thermosetting and are tolerant of additives, stabilizers, rate modifiers, hardness and/or toughness modifiers, fillers and fibers including, but not limited to, carbon, glass, aramid (e.g., Keylar® and Twaron®), polyethylene (e.g., Spectra® and Dyneema®), polyparaphenylene benzobisoxazole (e.g., Zylon®), polybenzamidazole (PBI), and hybrids thereof as well as other polymer fibers.

In the invention, the viscosity of the formulated olefin monomers (e.g., the olefin monomers combined with any additives, stabilizers, or modifiers other than density modulators, fillers, or fibers) is typically less than about 2,000 centipoise at temperatures near room temperature (e.g., from about 25–35° C.). Preferably, the viscosity of the formulated olefin monomers is less than about 500 centipoise, more preferably is less than about 200 centipose, and most preferably, is less than about 75 centipoise. The viscosity of the formulated olefin monomers can be controlled by selection of the combination of monomers and additives, stabilizers, and modifiers used.

Preferred hardness modulators include, for example, elastomeric additives such as polybutadienes, polyisoprenes, and the like. Polybutadienes and polyisoprenes of various sources, as well as various number-average molecular weights ($M_n$) or weight-average molecular weights ($M_w$), may be utilized in the invention as rubber-like hardness modulators. Unexpectedly, the poly-DCPD resins of the invention allow compositions containing polybutadiene to be clear rather than opaque. The hardness modulators of the invention, when added to a polyolefin resin composition, alter the hardness, toughness and/or surface "feel" of the composition compared to the unmodified or native polyolefin. In addition to butadiene and isoprene-based elastomers, other hardness modulators include plasticizers such as dioctyl phthalate and various molecular weight hydrocarbon and the like jellies, greases and waxes, carboxylic acids and salts thereof, and co-monomers such as norbornene, cyclooctadiene, cyclooctene, cyclohexenylnorbornene, norbornadiene, cyclopentene and/or methylcyclopentene. The amount of hardness modulator included in the polyolefin compositions of the invention is preferably about 0.1%–20% by weight of the olefin monomer to which it is added. More preferably, the amount of hardness modulator is about 1%–10% by weight of the olefin monomer and, most preferably, is about 2.5%–7.5%.

Especially preferred toughness modulators are rubber triblock copolymers such as styrene-butadiene-styrene, styrene-isoprene-styrene, styrene-ethylene/butylenes-styrene, styrene-ethylene/propylene-styrene, and the like. Other preferred toughness modulators include polysiloxanes, because the resulting polyolefin compositions possess significantly increased toughness properties without significant concomitant losses in heat distortion temperature (HDT). The amount of toughness modulator included in the polyolefin compositions of the invention is preferably about 0.1%–10% by weight of the olefin monomer to which it is added. More preferably, the amount of toughness modulator is about 0.5%–6% by weight of the olefin monomer and, most preferably, is about 2%–4%. For example, poly-DCPD resins containing 3 parts per hundred low molecular weight (MW) poly(dimethylsiloxane) (Shin Etsu DMF-50) possess notched Izod impact values in excess of 4 ft.-lb./in. and HDT values above 130° C.

The UV and oxidative resistance of the polyolefin compositions of the invention may be enhanced by the addition of various stabilizing additives such as primary antioxidants (e.g., sterically hindered phenols and the like), secondary antioxidants (e.g., organophosphites, thioesters, and the like), light stabilizers (e.g., hindered amine light stabilizers or HALS), and UV light absorbers (e.g., hydroxy benzophenone absorbers, hydroxyphenylbenzotriazole absorbers, and the like). Preferably, one or more stabilizing additives are included in the polyolefin resin composition at a level from about 0.01–15 phr. More preferably, the antioxidant(s) are present at a level of about 0.05–10 phr and, most preferably, 0.1–8 phr. Exemplary primary antioxidants include, for example, 4,4'-methylenebis (2,6-di-tertiary-butylphenol) (Ethanox 702®; Albemarle Corporation), 1,3,5-trimethyl-2,4,6-tris(3,5-di-tert-butyl-4-hydroxybenzyl)benzene (Ethanox 330®; Albermarle Corporation), octadecyl-3-(3',5'-di-tert-butyl-4'-hydroxyphenyl)propionate (Irganox 1076®; Ciba-Geigy), and pentaerythritol tetrakis(3-(3,5-di-tert-butyl-4-hydroxyphenyl)propionate)(Irganoxo® 1010; Ciba-Geigy). Exemplary secondary antioxidants include tris (2,4-ditert-butylphenyl)phosphite (Irgafos® 168; Ciba-Geigy), 1:11 (3,6,9-trioxaudecyl)bis(dodecylthio)propionate (Wingstay® SN-1; Goodyear), and the like. Exemplary light stabilizers and absorbers include bis(1,2,2,6,6-pentamethyl-4-piperidinyl)-[[3,5-bis(1,1-dimethylethyl)-4-hydroxyphenyl]methyl]butylmalonate (Tinuvin® 144 HALS; Ciba-Geigy), 2-(2H-benzotriazol-2-yl)-4,6-ditertpentylphenol (Tinuvin® 328 absorber; Ciba-Geigy), 2,4-di-tert-butyl-6-(5-chlorobenzotriazol-2-yl)phenyl (Tinuvin® 327 absorber; Ciba-Geigy), 2-hydroxy-4-(octyloxy)benzophenone (Chimassorb® 81 absorber; Ciba-Geigy), and the like.

In addition, a suitable rate modifier such as, for example, triphenylphosphine (TPP), tricyclopentylphosphine, tricyclohexylphosphine, triisopropylphosphine, trialkylphosphites, triarylphosphites, mixed phosphites, pyridine, or other Lewis base, may be added to the olefin monomer to retard or accelerate the rate of polymerization as required. In the case of TPP rate modifier, it is preferably included in an amount of about 10–200 mg: per 64 g olefin monomer. More preferably, the amount of TPP is about 20–100 mg per 64 g olefin monomer and, most preferably, is about 30–80 mg per 64 g olefin monomer. In the case of other rate modifiers, such as alkylphospines and pyridine, the amount of rate modifier is preferably about 0.1–50 mg per 64 g olefin monomer, more preferably about 1–40 mg:64 g olefin monomer, and most preferably is about 1–30 mg per 64 g olefin monomer.

Also, various pigments or dyes may be included in the polyolefin resin compositions of the invention for applications where color is desired. Preferred pigments include Ferro and Dayglo products, in an amount of about 0.05–2 parts per hundred of polyolefin resin. A particularly preferred class of dyes are photochromic dyes.

The polyolefin compositions, and parts or articles of manufacture prepared therefrom, may be processed in a variety of ways including, for example, Reaction Injection Molding (RIM), Resin Transfer Molding (RTM) and vacuum-assisted variants such as VARTM (Vacuum-Assisted RMT) and SCRIMP (Seemann Composite Resin Infusion Molding Process), open casting, rotational molding, centrifugal casting, filament winding, and mechanical machining. These processing compositions are well known in the art. Various molding and processing techniques are described, for example, in PCT Publication WO 97/20865, the disclosure of which is incorporated herein by reference. In mold casting processes, the mold may be constructed of various materials including, for example, aluminum, teflon, delrin, high- and low-density polyethylenes (HDPE and LDPE, respectively), silicone, epoxy, aluminum-filled epoxy, polyurethane and aluminum-filled polyurethane, plaster, polyvinylchloride (PVC), and various alloys of stainless steel. The mold temperature is preferably about 20–100° C., more preferably about 30–80° C., and most preferably about 40–60° C. The molded polyolefin part or article of the invention may also be subjected to a post-cure heating step. Preferably, the post-cure involves heating to about 60–160° C. for about 10 minutes–3 hours. More preferably, the post-cure involves heating to about 80–150° C. for about 30 minutes–2 hours and, and most preferably, involves heating to about 100–140° C. for between about 45 and about 90 minutes.

The polyolefin compositions of the invention are useful in the production of sports, recreation, and marine products and equipment. Examples of such products and applications include, but are not limited to, the following: golf tees, clubs (including weighted club heads), shafts, gradient shafts (where the formulation or density varies along the length of the club shaft), balls, and carts; basketball backboards; tennis rackets, squash rackets, racquetball rackets, and badminton racquets; snow boards, surfboards, boogie boards, skis, backboards, sleds, toboggans, snow shoes; baseball bats, bat coatings and end-caps, balls, and helmets; football helmets; hockey helmets, sticks, pads, and pucks; roller blade shoes, wheels, pads, and helmets; bicycle parts, frames, helmets, and trispokes; marine applications (e.g., hulls, coatings, oars, propellers, rudders, keels, masts, jet skis, boat fascia, jet skis, covers, kayaks, and canoes); camping equipment (e.g., tent stakes and supports, tubs, matches, coolers, wedges for splitting wood, axes, hatchets, handles, shovels, and picks); pool cues, pool tables, and pool balls; diving boards, pool liners, lake liners, ladders, steps, floating lounge chairs and tables, pool cleaning equipment, and lounge chairs; motorcycles, motorcycle parts, helmets, and shields; archery bows and arrows; guns, rifle cases, butts, bullets, shotgun pellets, decoys, ammunition and shell cases; martial arts protective padding and weapons; soccer goal posts and pads; auto racing helmets, car parts, and bodies; polo mallets, croquet mallets and balls, and cricket bats; gaming accessories (e.g., poker chips, dice, and weather resistant game boards); bowling balls and pins; tether ball pole, net supports in volleyball; All Terrain Vehicles (ATV); lawn darts, quoits, and horseshoes; and knives, knife handles, and swords. In particular, foams of various densities are useful in numerous applications where properties such as weight, buoyancy, acoustic impedance, anticorrosion, antifouling, and low moisture absorption are considerations.

Other commercial applications for the invention include, for example, ballistics and blast containment, industrial coatings, architectural coatings, and other scratch resistant coatings, adhesives, inks, paints, and gel coats. Additionally, the compositions of the invention are useful in polymer mixtures, interpenetrating polymer networks, composites (fiber or mineral reinforced), blends, alloys, elastomers, ionomers, and dendrimers, among others.

The compositions of the invention are also useful in the manufacture of wafer carriers and other semiconductor handling equipment, as well as parts for the construction of semiconductor fabrication facilities, such as walls, fascia, sinks, and decking. Additionally, these materials are useful as low k dielectrics and components for chemical/mechanical planarization (CMP).

In addition, the polyolefin resins may be used with adhesion agents, for example, metathesis active adhesion agents with compatibilizing functionalities for interacting with a substrate surface.

In the case of polyolefin compositions or parts comprising metallic density modulators, the invention permits the advantageous control of balance, weight and density localization. These capabilities provide for the enhancement of the performance of, for example, golf club heads and putters and composite tooling, through selective addition and location of metallic density modulators.

In the case of polyolefin compositions or parts comprising microparticulate density modulators (i.e., syntactic foam), advantages of the compositions of the invention are evidenced in the lightweight support and flexion enhancement of sports equipment such as archery bows, bats, sticks, and shafts. Other preferred uses for the syntactic foams of the invention include hulls and other components of boats and submersibles, core materials for skis and surf-, snow-, and skateboards, and lightweight reinforcement of safety equipment such as pads and helmets.

EXAMPLES

Example 1

Poly-DCPD Golf Putter Head

A mixture of 50 grams DCPD resin, 0.05 grams triphenylphosphine, 0.062 grams bis(tricyclopentylphosphine)dimethylvinylmethylidene ruthenium dichloride catalyst, 7.2 grams dioctylphthalate, 5.5 grams polybutadiene, and 1.5 grams Ethanox® 702 (Albemarle) primary antioxidant were mixed at room temperature and poured into a mold that had been previously formed into the shape of a golf putter head and that had been preheated to approximately 50° C. This mixture was cured in the mold for 2 hours and then post-cured for an additional hour at 130° C. The demolded putter head was of good shape and quality but only weighed about 60 grams which was much less than the desired weight of 300–350 grams.

Example 2

Density-Modified Poly-DCPD Golf Putter Head

Similarly to Example 1, a mixture of 50 grams DCPD resin, 0.05 grams triphenylphosphine, 0.062 grams bis(tricyclopentylphosphine)dimethylvinylmethylidene ruthenium dichloride catalyst, 5 grams polybutadiene, 1.5 grams Ethanox® 702 (Albemarle) primary antioxidant, and 350 grams tungsten powder were mixed at room temperature and poured into a mold that had been previously formed into the shape of a golf putter head and that had been preheated to approximately 75° C. A vacuum was applied to the mold for 5 minutes to help remove gas bubbles. This mixture was cured in the mold for 1 hour at 50° C. and then post-cured for an additional hour at 130° C. The demolded putter head was of good shape and quality and weighed about 350 grams, which was within the desirable range.

Example 3

Density-Modified Poly-DCPD Golf Putter Head

Similarly to Example 2, a mixture of 50 grams DCPD resin, 0.05 grams triphenylphosphine, 0.062 grams bis(tricyclopentylphosphine)dimethylvinylmethylidene ruthenium dichloride catalyst, 1.5 grams Ethanox® 702 (Albemarle) primary antioxidant, and 315 grams tungsten powder were mixed at room temperature, allowed to thicken, and then poured into a mold that had been previously formed into the shape of a golf putter head and that had been preheated to approximately 75° C. This mixture was cured in the mold for 30 minutes at 80° C. The demolded putter head was of good shape and quality and weighed about 313 grams, which was within the desirable range.

Example 4

Density-Modified Poly-DCPD Golf Putter Head

Following the general procedure in Example 3, a golf putter head was fabricated from a mixture of 65 grams DCPD resin, 0.05 grams triphenylphosphine, 0.124 grams bis(tricyclopentylphosphine)dimethylvinylmethylidene ruthenium dichloride catalyst, 3 grams Ethanox® 702 (Albemarle) primary antioxidant, 0.25 grams black pigment (Ferro), 100 grams tungsten powder, and 217.4 grams iron powder. The demolded putter head was of good shape and quality and weighed about 352 grams, which was at the top of the desirable range.

Example 5

Density-Modified Poly-DCPD Golf Putter Head

Following the general procedure in Example 3, a golf putter head was fabricated from a mixture of 75 grams DCPD resin, 0.75 grams triphenylphosphine, 0.093 grams bis(tricyclopentylphosphine)dimethylvinylmethylidene ruthenium dichloride catalyst, 2.25 grams Ethanox® 702 (Albemarle) primary antioxidant, 0.375 grams black pigment (Ferro), 96 grams aluminum powder, and 245 grams tungsten powder. The demolded putter head was of good shape and quality and weighed about 350 grams, which was at the top of the desirable range, and had a "softer" sound that the putter heads fabricated in Example 2–Example 4.

Example 6

Face-Weighted Hybrid Rubber/Tungsten Metal-Poly-DCPD Golf Putter Head

Using the same general procedure set forth in Example 1 above, two batches of resin were prepared containing:

67 g DCPD monomer (B. F. Goodrich), 28 g polybutadiene (Aldrich; 3000 MW), 2.8 g cis-cyclooctene (Avocado), 1 g t-butyl peroxide (Aldrich), 0.33 g black pigment (Ferro), 0.1 g triphenylphosphine, and 0.124 g (bis(tricyclohexylphosphine)benzylidene ruthenium dichloride metathesis catalyst (sieved through a 45 mesh size sieve); and 50 g DCPD monomer (B. F. Goodrich), 1.5 g Ethanox® 702 (Albemarle Corp.), 0.33 g black pigment (Ferro), 300 g tungsten powder (Teledyne Advanced Materials; 150 mesh), 0.05 g triphenylphosphine, and 0.124 g (bis(tricyclohexylphosphine)benzylidene ruthenium dichloride metathesis catalyst (sieved through a 45 mesh size sieve).

A mold that had been previously formed into the shape of a golf putter head was heated to approximately 50° C. The black liquid resin A was poured into the mold, filling it to within approximately one inch of the top (face of the putter head). Within 30 minutes, resin A appeared to be gelled and within 1 hour resin B, a viscous black liquid, was poured into the mold on top of gelled resin A, filling the mold completely. After 1 hour, the golf putter head was demolded and allowed to cool for 12 hours. The golf putter head was then subjected to a post-cure at 130° C. for a period of 1 hour and cooled to ambient temperature. The resulting face-weighted putter head massed 350 g and displayed a surface hardness of D50 (Shore).

Example 7

Heel/Toe Perimeter-Weighted Hybrid Rubber/ Tungsten-Poly-DCPD Golf Putter Head

Resins A and B were prepared as in Example 6 above. In this case, however, the golf putter mold was completely filled with resin A and, after gelling 1 h in the mold, the putter head was demolded and allowed to cool for 12 hours. A portion of each of the heel and toe areas of the putter was removed, and the remainder of the part reinserted into the mold, which was then preheated to approximately 50° C. Resin B was then poured into the mold, filling in the voids created by the removal of the heel and toe sections of the putter head. After 1 hour, the part was demolded and allowed to cool for 12 hours. The putter head was then subjected to a post-cure at 130° C. for a period of 1 hour and cooled to ambient temperature. The resulting heel/toe perimeter-weighted putter head weighed 300 g and displayed a surface hardness of D50 (Shore).

Example 8

Heel/Toe Perimeter-Weighted Aluminum Metal- Poly-DCPD Golf Putter Head

A putter head was prepared as described in Example 7 above, but not subjected to post-cure. After demolding, approximately 1" of the non-tungsten-filled plastic was removed from the face of the putter. The putter head was reinserted into the mold and the mold was then heated to approximately 50° C. In a 100 ml RB flask a resin was prepared containing 50 g DCPD monomer (B. F. Goodrich), 1.5 g Ethanox® 702 (Albemarle Corp.), 10 g aluminum powder (Alfa Aesar; 3 micron), 0.05 g triphenylphosphine, and 0.062 g (bis(tricyclohexylphosphine)benzylidene ruthenium dichloride metathesis catalyst (sieved through a 45 mesh size sieve). The fresh resin was poured into the mold, thereby filling in the void created by the prior removal of the non-tungsten-filled plastic material from the putter face. Within 30 minutes, the aluminum-filled resin appeared to be gelled and within 1 hour the molded putter head was removed from the mold and allowed to cool for 12 hours. The putter head was then subjected to a post-cure at 130° C. for a period of 1 hour and cooled to ambient temperature before a shaft was attached thereto. The overall mass and weighting characteristics of the resulting putter were similar to those of the putter in Example 6, but with a significantly softer and more solid sound and feel when used to strike (putt) a golf ball.

Example 9

Glass Microsphere-Poly-DCPD Syntactic Foam Panel

A 5 L RB flask equipped with a magnetic stir bar and a gas inlet adaptor was charged with 2250 g DCPD monomer (B. F. Goodrich), 67.5 g Ethanox® 702 (Albemarle Corp.), 4.5 g triphenylphosphine, and 2.497 g (bis(tricyclopentylphosphine)dimethylvinylmethylidene ruthenium dichloride metathesis catalyst (sieved through a 45 mesh size sieve). Glass microspheres (3M; K25 grade, 720 g) that had been dried at 130° C. for 6 hours were gradually added to the resin in the 5 L RB flask with stirring, resulting in a pale yellow mixture with the viscosity of lightly whipped cream. This resin mixture was degassed in vacuo to remove any trapped air bubbles (~20 min.) and then poured into a rectangular mold that had been preheated to 40° C. The part was cured in the mold at 40° C. for 12 hours, then post-cured in the mold for 40 min. at 130° C., then for an additional 20 min. at 150° C. After cooling to ambient temperature, the demolded panel was found to be essentially void-free and having a density of about 34 pounds per cubic foot (pcf). After appropriate machining and conditioning, this material displayed a DTUL (264 psi) of 130° C., Izod strengths of 0.965 ft.-lb./in (unnotched) and 0.329 ft.-lb./in (notched), a compressive strength of 10,000 psi and a compressive modulus of 250,000.

Example 10

Glass Microsphere-Poly(dimethylsiloxane)- modified-Poly-DCPD Syntactic Foam Panel In the same manner as Example 9 was prepared a resin comprising: 200 g DCPD monomer (B. F. Goodrich), 6 g Ethanox® 702 (Albemarle Corp.), 6 g poly(dimethylsiloxane) (Shin Etsu DMF-50), 0.4 g triphenylphosphine, and 0.22 g (bis(tricyclopentylphosphine)dimethylvinylmethylidene ruthenium dichloride metathesis catalyst (sieved through a 45 mesh size sieve), and 74 g glass microspheres (3M; K25 grade). The syntactic foam of this Example displayed an unnotched Izod strength of 2.4 ft.-lb./in.

Example 11

Low-Density Syntactic Foam

A mixture of 300 grams of DCPD resin (Ultrene® 99 from B. F. Goodrich), 1.0 gram triphenylphosphine, 9 grams Ethanox® 702 (Albemarle) primary antioxidant, 1.0 gram bis(tricyclopentylphosphine)dimethylvinylmethylidene ruthenium dichloride catalyst, and 96 grams glass microspheres (3M Scotchlite™ K1) were mixed at room temperature, poured into a rectangular mold, and allowed to cure. The demolded foam specimen was observed to be of good quality and was measured to have a very low density of 20 pcf, which is difficult to achieve with other thermoset compositions. Samples of the syntactic foam of this example displayed an average compressive strength of 860 psi and an average compressive modulus of 69,000 psi.

Example 12

Solvent-Assisted Syntactic Foam Fabrication Composition

A mixture of 100 grams of DCPD resin, 0.1 grams triphenylphosphine, 3 grams Ethanox® 702 (Albemarle) primary antioxidant, 0.124 grams bis(tricyclopentylphosphine)dimethylvinylmethylidene ruthenium dichloride catalyst, 75 grams glass microspheres (3M Scotchlite® K25), and 100 grams acetone were mixed at room temperature, poured into a rectangular mold, and allow to sit until the viscosity of the mixture had thickened to a gel state. The mold was then placed into a convection oven, preheated to 60° C., for 40 minutes to finish the cure and allow most of the acetone solvent to evaporate. The sample was then removed from the oven, demolded, and sliced into several pieces. These pieces were held in a convection oven overnight at 40° C. to remove the remaining acetone solvent. The measured density of 12 pcf of these samples was much lower than the theoretical density of 28 pcf that would have been predicted without use of the acetone solvent.

Example 13

Demonstration of Wide Density Variation

A mixture of 200 grams DCPD resin, 0.2 grams triphenylphosphine, 6 grams of Ethanox® 702 (Albemarle) primary antioxidant, and 0.248 grams of bis(tricyclopentylphosphine)dimethylvinylmethylidene ruthenium dichloride catalyst was mixed with each of the density modulators shown in Table 1. After curing and demolding, the densities of the resulting specimens were measured to be as listed in Table 1.

TABLE 1

| Density Modulator | Weight of Density Modulator | Density of Resulting Polyolefin Composition |
| --- | --- | --- |
| Iron powder (-200 mesh) | 69 grams | 3.18 g/cm³ |
| Tungsten powder (-150 mesh) | 252 grams | 11.62 g/cm³ |
| Aluminum powder (20 micron spheres) | 35.8 grams | 1.64 g/cm³ |
| Titanium | 45.8 grams | 2.11 g/cm³ |
| Large Vermiculite | 17.4 grams | 0.80 g/cm³ |
| Fine Vermiculite | 20.2 grams | 0.93 g/cm³ |
| Glass Microspheres (Scotchlite ™ K1) | 11.7 grams | 0.53 g/cm³ |

Example 14

A mixture of 400 grams DCPD resin, 0.8 grams triphenylphosphine, 12 grams Ethanox® 702 (Albemarle) primary antioxidant, 0.496 grams bis(tricyclopentylphosphine)dimethylvinylmethylidene ruthenium dichloride catalyst, and 108 grams glass microspheres (3M Scotchlite™ K1) was prepared as a thick paste at room temperature. This paste was dropped piecemeal into an aluminum baseball bat shell with a 2.625-inch OD and 0.05-inch wall thickness until the shell was full. Tapping of the handle of the bat on the ground and use of a plunger was used to consolidate the syntactic foam paste within the shell. The foam mixture was allowed to cure at room temperature until solid and then post-cured for 1 hour at 140° C. The resulting foam core had a density of about 25 pcf and a Shore D' hardness of 55. The resulting baseball bat had a heavy feel and a relatively high moment-of-inertia (MOI) of 789 lb·in·in (typically a range from about 600–750 is most desirable). When used to hit baseballs, the finished bat was reported to feel and sound like wood and was very durable, withstanding over 500 hits without failure.

Example 15

The procedure of Example 14 was followed except using an aluminum baseball bat shell with a wall thickness of only 0.036–0.037 inches. The resulting baseball bat was less heavy with a reduced MOI of 763 lb·in·in. When used to hit baseballs, the resulting bat was reported to feel and sound like wood and was very durable, withstanding over 2,000 hits without failure. Similar bats made with other syntactic foam materials of similar density were prone to denting after only a few hits.

Example 16

The procedure of Example 15 was followed except that a ¾-inch diameter hole was bored approximately 12 inches deep into the center of the cured foam core. The resulting baseball bat was much less heavy with a MOI of only 737 lb·in·in. When used to hit baseballs, however, the resulting bat dented after only a few hits.

Example 17

A mixture of 200 grams DCPD resin, 0.2 grams triphenylphosphine, 6 grams Ethanox® 702 (Albemarle) primary antioxidant, 0.248 grams bis(tricyclopentylphosphine)dimethylvinylmethylidene ruthenium dichloride catalyst, and 50 grams glass microspheres (3M Scotchlite™ K1) was prepared as a thick paste at room temperature and spread into a rectangular mold. A vacuum bag and bleeder cloth were applied to the open face of the mold and vacuum applied until resin could be seen seeping into the bleeder cloth. The mixture was cured for 9 hours at 40° C. in an oven and then post-cured for 70 minutes at 140° C. After machining to a regular block shape, the resulting syntactic foam was measured to have a density of 24.5 pcf. An aluminum-faced sandwich panel utilizing this material as a core did not dent from the impact of a baseball fired from a cannon until the ball velocity reached 100 mph.

Example 18

Following the procedure of Example 17, a mixture of 225 grams DCPD resin, 0.45 grams triphenylphosphine, 6.75 grams Ethanox® 702 (Albemarle) primary antioxidant, 0.279 grams bis(tricyclopentylphosphine) dimethylvinylmethylidene ruthenium dichloride catalyst, and 50 grams glass microspheres (3M Scotchlite™ K1) was used to prepare a syntactic foam block with a density of 22.5 pcf. An aluminum-faced sandwich panel utilizing this material as a core did not dent from the impact of a baseball fired from a cannon until the ball velocity reached 80 mph.

Example 19

Following the procedure of Example 17, a mixture of 325 grams DCPD resin, 0.65 grams triphenylphosphine, 9.75 grams Ethanox® 702 (Albemarle) primary antioxidant, 0.403 grams bis(tricyclopentylphosphine) dimethylvinylmethylidene ruthenium dichloride catalyst, and 50 grams glass microspheres (3M Scotchlite™ K1) was used to prepare a syntactic foam block with a density of 26.5 pcf. An aluminum-faced sandwich panel utilizing this material as a core did not dent from the impact of a baseball fired from a cannon until the ball velocity reached 140 mph.

Example 20

Following the procedure of Example 17, a mixture of 2,000 grams DCPD resin, 4 grams triphenylphosphine, 60 grams Ethanox® 702 (Albemarle) primary antioxidant, 2.48 grams bis(tricyclopentylphosphine) dimethylvinylmethylidene ruthenium dichloride catalyst, and 640 grams glass microspheres (3M Scotchlite™ K25) was used to prepare a syntactic foam block with a density of 34 pcf. An aluminum-faced sandwich panel utilizing this material as a core did not dent from the impact of a baseball fired from a cannon with ball velocities up to 180 mph.

Example 21

A mixture of 200 grams DCPD resin, 0.1 grams triphenylphosphine, 6 grams Ethanox® 702 (Albemarle)

primary antioxidant, 0.248 grams bis(tricyclopentylphosphine)dimethylvinylmethylidene ruthenium dichloride catalyst, and 25 grams unexpanded thermoplastic microspheres (Expancel® 091 DU 80) was prepared at room temperature and poured into a cylindrical mold 4 inches tall and 2.35 inches in diameter. The mixture became hot enough from the exothermic cure reaction to cause the thermoplastic microspheres to expand. After curing and demolding, the overall density of the resulting component was about 35–36 pcf. Upon inspection, the component had a foam-like core but an unfoamed outer skin approximately ⅛-inch thick.

Example 22

A mixture of 200 grams DCPD resin, 0.2 grams triphenylphosphine, 6 grams of Ethanox® 702 (Albemarle) primary antioxidant, and 0.248 grams of bis(tricyclopentylphosphine)dimethylvinylmethylidene ruthenium dichloride catalyst is mixed with 400 grams of boron carbide powder (Alfa-Aesar, 22–59 microns) and cast into a rectangular mold. This is then cured for 8 hours at 40° C. and post-cured for 1 hour at 140° C. The density of the demolded block is approximately 1.6–1.7 g/cm$^3$ and it is particularly useful in the construction of armors for ballistic protection and blast containment.

Example 23

A rectangular mold is filled with 500 grams of boron carbide whiskers (Alfa Aesar, average of 5–8 micron diameter by 300 micron length) and then fitted with a bleeder cloth and vacuum. A vacuum is applied to the mold to compact the whiskers. The mold is then infused with a mixture of 200 grams DCPD resin, 0.2 grams triphenylphosphine, 6 grams of Ethanox® 702 (Albemarle) primary antioxidant, and 0.248 grams of bis(tricyclopentylphosphine)dimethylvinylmethylidene ruthenium dichloride catalyst. After complete saturation, the part is cured for 8 hours at 40° C. and post-cured for 1 hour at 140° C. The density of the demolded block is approximately 1.7–1.8 g/cm$^3$ and it is particularly useful in the construction of armors for ballistic protection and blast containment.

Example 24

Density-Modulated Armor Panel with Resinous Skin

A rectangular mold is filled with 500 grams of silicon carbide platelets (Alfa Aesar, −100/+200 mesh). A mixture of 200 grams DCPD resin, 0.2 grams triphenylphosphine, 6 grams of Ethanox® 702 (Albemarle) primary antioxidant, and 0.248 grams of bis(tricyclopentylphosphine)dimethylvinylmethylidene ruthenium dichloride catalyst is poured into the mold and allowed to settle down through the silicon carbide platelets, leaving a thin pool of resin sitting above the solid. After complete saturation, the part is cured for 8 hours at 40° C. and post-cured for 1 hour at 140° C. The overall density of the demolded block is approximately 2 g/cm$^3$. This article possesses a resinous outer skin on one surface and is particularly useful in the construction of armors for ballistic protection and blast containment.

Example 25

Syntactic Foam Core Material with Extremely Low Shrinkage

A mixture of 200 grams DCPD resin, 0.1 grams triphenylphosphine, 6 grams Ethanox® 702 (Albemarle) primary antioxidant, 0.248 grams bis(tricyclopentylphosphine)dimethylvinylmethylidene ruthenium dichloride catalyst, 33.4 grams Scotchlite™ K1 Glass Microballoons, and 3.4 grams unexpanded thermoplastic microspheres (Expancel® 091 DU 80) was prepared at room temperature and poured into a cylindrical mold 4 inches tall and 2.35 inches in diameter. The mixture became hot enough from the exothermic cure reaction to cause the thermoplastic microspheres to expand, so that after curing the part had not shrunk away from the mold walls. The overall density of the resulting component was about 31 pcf.

Example 26

One-Step Molding of Fiber-Reinforced Ballistic Foam Panel

A 6×6×1 inch rectangular mold was laid up with 2 plies Volan-sized 7781 E-Glass fabric on each of the two opposite 6×6 inch walls. A mixture of 500 grams DCPD resin, 50 g polybutadiene (Aldrich, $M_w$=5000), 0.125 grams triphenylphosphine, 15 grams Ethanox® 702 (Albemarle) primary antioxidant, 0.62 grams bis(tricyclopentylphosphine)dimethylvinylmethylidene ruthenium dichloride catalyst, and 90 grams unexpanded thermoplastic microspheres (Expancel® 091 DU 80) was prepared at room temperature and poured into the mold. The mixture became hot enough from the exothermic cure reaction to cause the thermoplastic microspheres to expand and force the polymerizing resin to infiltrate the fiber preform. Upon inspection, the component had a foam-like core with an unfoamed glass fabric composite outer skin. This panel stopped a 0.38 Special round fired from a distance of approximately 15 feet. The overall density of the resulting component was about 34 pcf.

Example 27

Dense Syntactic Foam

A mixture of 100 grams DCPD resin, 0.1 grams triphenylphosphine, 3 grams Ethanox® 702 (Albemarle) primary antioxidant, 0.1 grams bis(tricyclopentylphosphine)dimethylvinylmethylidene ruthenium dichloride catalyst, and 150 grams Zeeosphere™ G-600 ceramic microspheres (3M) was prepared at room temperature and poured into a flat panel mold. The part was cured for 1 h at 40 ° C., 2 h at ambient temp, and 1 h at 140 ° C. This dark gray syntactic foam had a density of 107 pcf.

Example 28

Miniature Low Density Syntactic Foam Bat

A mixture of 250 grams DCPD resin, 0.75 grams triphenylphosphine, 7.5 grams Ethanox® 702 (Albemarle) primary antioxidant, 0.310 grams bis(tricyclopentylphosphine)dimethylvinylmethylidene ruthenium dichloride catalyst, and 112.5 grams unexpanded thermoplastic microspheres (Expancel® 551-DU-20) was prepared and allowed to thicken (several 100 cP) until no settling of microspheres was observed. The thickened resin was then poured into a 270 cm$^3$ mold in the shape of a baseball bat with a barrel diameter of 1.5 in., handle diameter of 0.7 in. and a length of 16.75 in. The part was cured in-mold in a 70° C. oven for ca. 1 h until gelled. The gelled part was then removed from the mold while the oven temperature was raised to 90° C. The part was returned to the oven and the temperature raised to 120° C. The part was allowed to cure at this temperature for 15 minutes then cooled to room temperature. During this final cure, the mixture became hot enough to cause the thermoplastic microspheres to expand, increasing the barrel diameter to 2.7 in. (80%), the handle diameter to 1.3 in. (85%), and the length to 32 in. (94%). The overall density of the resulting component was approximately 10 pcf.

Example 29

Vacuum Method for Resin-Poor Syntactic Foam

A mixture of 225 grams DCPD resin, 0.45 grams triphenylphosphine, 6.75 grams Ethanox® 702 (Albemarle) primary antioxidant, 0.279 grams bis(tricyclopentylphosphine)dimethylvinylmethylidene ruthenium dichloride catalyst, and 50 grams Scotchlite™ K1 Glass Microballoons was prepared at room temperature and poured into a mold cavity approximately 6×6 inches in area and 1 inch deep. The mold was bagged with three successive layers: perforated release film, bleeder felt, and bagging film. Vacuum was applied to the bagged mold and excess liquid resin was drawn into the bleeder felt. The molded panel was cured under vacuum for 9 h at 40° C., then post-cured at 140° C. for 1 h and 10 min. The overall density of the resulting component was about 22.5 pcf.

What is claimed is:

1. A composition consisting essentially of:
one or more density modulators dispersed in a polycyclic olefin resin matrix prepared by the metathesis of an olefin monomer using a ruthenium or osmium metal carbene catalyst of the formula:

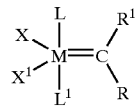

wherein:

M is ruthenium or osmium;

X and $X^1$ are either the same or different and are any anionic ligand;

L and $L^1$ are either the same or different and are any neutral electron donor;

R and $R^1$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is unsubstituied or substituted with one or more substituted or unsubstituted moieties selected from the group consisting of $C_1$–$C_{20}$ alkyl, $C_1$–$C_{10}$ alkoxy, and aryl.

2. The composition of claim 1 wherein the substitutent group is substituted with one or more substituted or unsubstituted moieties selected from the group consisting of $C_1$–$C_{10}$ alkyl, $C_1$–$C_{10}$ alkoxy, and aryl.

3. The composition of claim 2 wherein the moiety is substituted with one or more groups selected from the group consisting of halogen, $C_1$–$C_5$ alkyl, $C_1$–$C_5$ alkoxy, and phenyl.

4. The composition of claim 1 wherein R is hydrogen and $R^1$ is selected from the group consisting of $C_1$–$C_{20}$ alkyl, $C_2$–$C_{20}$ alkenyl, aryl, unsubstituted phenyl, substituted phenyl, unsubstituted vinyl, and substituted vinyl; and wherein the substituted phenyl and substituted vinyl are each independently substituted with one or more groups selected from the group consisting of $C_1$–$C_5$ alkyl, $C_1$–$C_5$ alkoxy, phenyl, hydroxyl, thiol, ketone, aldehyde, ester, ether, amine, imine, amide, nitro, carboxylic acid, disulfide, carbonate, isocyanate, carbodiimide, carboalkoxy, and halogen.

5. The composition of claim 1 wherein L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether.

6. The composition of claim 1 wherein L and $L^1$ are each a phosphine of the formula $PR^3R^4R^5$ wherein $R^3$, $R^4$, and $R^5$ are each independently selected from the group consisting of aryl and $C_1$–$C_{10}$ alkyl.

7. The composition of claim 6 wherein $R^3$, $R^4$, and $R^5$ are each independently selected from the group consisting of primary alkyl, secondary alkyl, and cycloalkyl.

8. The composition of claim 6 wherein L and $L^1$ are each independently selected from the group consisting of P(cyclohexyl)$_3$, P(cyclopentyl)$_3$, P(isopropyl)$_3$, and P(phenyl)$_3$.

9. The composition of claim 1 wherein L and $L^1$ comprise a bidentate ligand.

10. The composition of claim 1 wherein L is any neutral electron donor and $L^1$ is an imidazolidine ligand.

11. The composition of claim 10 wherein $L^1$ has the general formula:

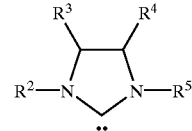

wherein:

$R^2$, $R^3$, $R^4$, and $R^5$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl.

12. The composition of claim 11 wherein $R^3$ and $R^4$ together form a cycloalkyl or an aryl moiety.

13. The composition of claim 11 wherein $R^3$ and $R^4$ are both hydrogen or phenyl and $R^2$ and $R^5$ are each independently substituted or unsubstituted aryl.

14. The composition of claim 1 wherein X and $X^1$ are each independently selected from the group consisting of hydrogen, halogen, substituted moiety and unsubstituted moiety, wherein the moiety is selected from the group consisting of $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl, and wherein the moiety substitution is selected from the group consisting of $C_1$–$C_{10}$ alkyl, $C_1$–$C_{10}$ alkoxy, and aryl.

15. The composition of claim 14 wherein the moiety substitution is substituted with one or more groups selected from the group consisting of halogen, $C_1$–$C_5$ alkyl, $C_1$–$C_5$ alkoxy, and phenyl.

16. The composition of claim 1 wherein X and $X^1$ are each independently selected from the group consisting of halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate.

17. The composition of claim 1 wherein X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate.

18. The composition of claim 16 wherein X and $X^1$ are both chloride.

19. The composition of claim 1 wherein X and $X^1$ comprise a bidentate ligand.

20. The composition of claim 1 wherein the one or more density modulators are selected from the group consisting of metallic density modulators, microparticulate density modulators and macroparticulate density modulators.

21. The composition of claim 1 wherein the density modulator is present in an amount of about 1% to about 99% by volume.

22. The composition of claim 21 wherein the density modulator is present in an amount of about 20% to about 90% by volume.

23. The composition of claim 22 wherein the density modulator is present in an amount of about 30% to about 80% by volume.

24. The composition of claim 23 wherein the density modulator is present in an amount of about 60% to about 95% by volume.

25. The composition of claim 20 wherein the metallic density modulator is selected from the group consisting of powdered metals, sintered metals, shaved metals, flaked metals, filed metals, particulated metals, granulated metals, metal oxides, metal nitrides, and metal carbides.

26. The composition of claim 20 wherein the metallic density modulator is selected from the group consisting of tungsten, tungsten carbide, aluminum, titanium iron, lead, silicon oxide, and aluminum oxide.

27. The composition of claim 20 wherein the microparticulate density modulator is selected from the group consisting of glass microspheres, thermoplastic microspheres, thermoset microspheres, and ceramic/silicate microspheres.

28. The composition of claim 27 wherein the thermoplastic microsphere is expandable or pre-expanded.

29. The composition of claim 20 wherein the macroparticulate density modulator is selected from the group consisting of glass beads, plastic beads, ceramic beads, metal rods, metal chunks, metal pieces, metal shot, hollow glass spheres, hollow ceramic spheres, hollow plastic spheres, hollow glass balls, hollow ceramic balls, hollow plastic balls, hollow glass tubes, hollow ceramic tubes, and hollow glass tubes.

30. The composition of claim 1 wherein the olefin monomer is selected from the group consisting of cyclooctadiene, cyclooctene, cyclohexenylnorbornene, cyclopropene, cyclobutene, benzocyclobutene, cyclopentene, cyclopentadiene oligomers, cyclohexene, cycloheptene, norbornene, norbornadiene, [2.2.1]bicycloheptene, and [2.2.2]bicyclooctene; and wherein the monomer is substituted or unsubstituted.

31. The composition of claim 1 wherein the olefin monomer is dicyclopentadiene.

32. The composition of claim 1 further consisting essentially of an additive selected from the group consisting of pigments, dyes, antioxidants, flame retardants, toughness modulators, and hardness modulators.

33. The composition of claim 1 further consisting essentially of at least one fiber.

34. The composition of claim 33 wherein the fiber is selected from the group consisting of carbon, glass, aramid, polyethylene, polyparaphenylene benzobisoxazole, polybenzamidazole, and hybrids thereof.

35. The composition of claim 1 further consisting essentially of at least one antioxidant.

36. The composition of claim 35 wherein the antioxidant is present in an amount of about 0.01 to about 15 parts per hundred resin.

37. The composition of claim 36 wherein the antioxidant is present in an amount of about 0.05 to about 10 parts per hundred resin.

38. The composition of claim 37 wherein the antioxidant is present in an amount of about 0.1 to about 8 parts per hundred resin.

39. The composition of claim 35 wherein the antioxidant is selected from the group consisting of sterically hindered phenols, organophosphites, thioesters, hindered amine light stabilizers, hydroxy benzophenone absorbers, and hydroxyphenylbenzotriazole absorbers.

40. The composition of claim 35 wherein the antioxidant is selected from the group consisting of 4,4'-methylenebis (2,6-di-tertiary-butylphenol), 1,3,5-trimethyl-2,4,6-tris(3,5-di-tert-butyl-4-hydroxybenzyl) benzene, and octadecyl-3-(3',5'-di-tert-butyl-4'-hydroxylphenyl) propionate.

41. The composition of claim 1 further consisting essentially of a rate modifier.

42. The composition of claim 41 wherein the rate modifier is a Lewis base.

43. The composition of claim 41 wherein the rate modifier is selected from the group consisting of triphenylphosphine, tricyclopentylphosphine, tricyclohexylphosphine, triisopropylphosphine, alkyl phosphite, aryl phosphite, and pyridine; and wherein the rate modifier is substituted or unsubstituted.

44. The composition of claim 1 further consisting essentially of a pigment.

45. The composition of claim 44 wherein the pigment is present in an amount of about 0.05 to about 2.0 parts per hundred resin.

46. The composition of claim 1 further consisting essentially of a dye.

47. The composition of claim 46 wherein the dye is a photochromic dye.

48. The composition of claim 1 wherein the catalyst is present in a ratio with the monomer, and wherein the catalyst:monomer ratio is in a range of about 1:100 to about 1:1,000,000.

49. The composition of claim 48 wherein the catalyst:monomer ratio is in a range of about 1:1,000 to about 1:150,000.

50. The composition of claim 49 wherein the catalyst:monomer ratio is in a range of about 1:3,000 to about 1:60,000.

51. The composition of claim 1 wherein the catalyst is selected from the group consisting of bis(tricyclohexylphosphine)benzylidene ruthenium dichloride, bis(tricyclohexylphosphine)dimethylvinylmethylidene ruthenium dichloride, bis(tricyclopentylphosphine) dimethylvinylmethylidene ruthenium dichloride, (tricyclohexylphosphine)(1,3-dimesityl-4,5-dihydroimidazol-2-ylidene) benzylidene ruthenium dichloride, (tricyclopentylphosphine)(1,3-dimesityl-4,5-dihydroimadizol-2-ylidene)dimethylvinylmethylidene ruthenium dichloride, (tricyclohexylphosphine)(1,3-dimesityl-4,5-dihydroimadazol-2-ylidene) dimethylvinylmethylidene ruthenium dichloride, (tricyclohexylphosphine)

(1,3-dimesitylimidazol-2-ylidene) benzylidene ruthenium dichloride, (tricyclopentylphosphine)(1,3-dimesitylimidazol-2-ylidene) dimethylvinylmethylidene ruthenium dichloride, and (tricyclohexylphosphine(1,3-dimesitylimidazol-2-ylidene)dimethylvinylmethylidene ruthenium dichloride.

52. A high density polycyclic olefin composition comprising: one or more density modulators dispersed in a polycyclic olefin resin matrix prepared by the metathesis of an olefin monomer using a ruthenium or osmium metal carbene metathesis catalyst, wherein the one or more density modulators are selected from the group consisting of tungsten and tungsten carbide.

53. A low density polycyclic olefin composition comprising: one or more density modulators dispersed in a polycyclic olefin resin matrix prepared by the metathesis of an olefin monomer using a ruthenium or osmium metal carbene catalyst, wherein the one or more density modulators are thermoplastic microspheres.

54. A method of modulating the density of a polycyclic olefin resin matrix comprising:

(a) reacting a cyclic olefin with a ruthenium or osmium metal carbene catalyst to form a reaction mixture, wherein the catalyst is of the formula:

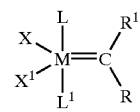

wherein:

M is ruthenium or osmium;

X and $X^1$ are either the same or different and are any anionic ligand;

L and $L^1$ are either the same or different and are any neutral electron donor;

R and $R^1$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is unsubstituted or substituted with one or more substituted or unsubstituted moieties selected from the group consisting of $C_1$–$C_{20}$ alkyl, $C_1$–$C_{10}$ alkoxy, and aryl; and (b) adding a density modulator to the reaction mixture.

* * * * *